United States Patent [19]
Frazier

[11] Patent Number: 5,922,484
[45] Date of Patent: *Jul. 13, 1999

[54] LONG-LIFE STORAGE BATTERY WITH A HEAT SOURCE AND A MAGNETIC FIELD SOURCE

[76] Inventor: Leland Scott Frazier, 4744 Vista De Oro Ave., Woodland Hills, Calif. 91364

[*] Notice: This patent is subject to a terminal disclaimer.

[21] Appl. No.: 08/692,171

[22] Filed: Aug. 5, 1996

[51] Int. Cl.$^6$ .................................................. H01M 6/36
[52] U.S. Cl. .............................. 429/10; 429/112; 429/133
[58] Field of Search .............................. 429/10, 112, 122, 429/129, 133

[56] References Cited

U.S. PATENT DOCUMENTS

| | | |
|---|---|---|
| 4,042,754 | 8/1977 | Borello ........................................ 429/10 |
| 4,235,956 | 11/1980 | Gross et al. ............................. 429/112 |
| 4,416,000 | 11/1983 | Scherbatskoy ....................... 429/112 X |
| 4,469,759 | 9/1984 | Newill ....................................... 429/10 |

*Primary Examiner*—Stephen Kalafut
*Attorney, Agent, or Firm*—Lyon & Lyon LLP

[57] ABSTRACT

A long-life battery has a heat source and a magnetic field source to improve the efficiency and life of the battery's ability to deliver an electrical charge. In particular, an open-ended steel insert having two acid containers containing a muriatic-hydrochloric acid mixture heats up an electrolytic solution that flows within the battery. A magnet disposed between the acid containers generates the magnetic field. The battery may be terminal-less and use insulated leads that extend from the battery. The insulated leads have connectors for coupling to an electrically-powered device.

13 Claims, 3 Drawing Sheets ced during discharge by way of an
LONG-LIFE STORAGE BATTERY WITH A HEAT SOURCE AND A MAGNETIC FIELD SOURCE This application is related to the patent application, entitled "LONG-LIFE STORAGE BATTERY WITH A MAGNETIC FIELD SOURCE AND AN ACID BASED HEAT SOURCE," Ser. No. 08/692,170, filed concurrently herewith on Aug 2, 1996.

TECHNICAL FIELD

The field of the present invention is batteries. In particular, described herein is a long-life secondary or storage battery which uses a heat source and magnetic field to extend the life of the battery and improve the battery's ability to deliver an electrical charge.

BACKGROUND OF THE INVENTION

Secondary or storage batteries are made up of an electrochemical cell or cells that generate electricity. Rechargeable storage batteries can be recharged by passing a current through them in the reverse direction. The voltage or force generated by the recharging process depends on the number of cells that make up the battery. Normally each cell produces 2.05 volts. Cells may be connected in a series to create a battery with greater voltage, although the amperage or current is only the current of the one cell. Should greater current be required, the cells may be arranged in a parallel connection where the current is then the summed current of the cells. In this configuration, however, the voltage is only that of one cell, or the sum of the voltages across any cells which are connected in series (if any). In many cases, storage batteries are restricted to producing six or twelve volts.

Common drawbacks with such batteries include the short battery life between charges and the limited set of voltage and current configurations. These drawbacks are some of the major reasons why these batteries are not used extensively as stand-alone power sources. Electric cars, for example, would benefit enormously from a long-lasting battery which is powerful, economical and lightweight. But to date, existing batteries do not provide sufficient power over time to make the range and speed of such a car economically viable. The batteries now used to run completely electric cars are heavy, expensive and must be recharged every 50 to 75 miles. Consequently, electrically powered cars are slow, suffer from limited acceleration and have a short range. Additionally, the batteries lose their efficacy after a certain number of recharge cycles and must be replaced at great expense.

Storage batteries generate electricity through a chemical process that occurs at their electrode plates. For example, modern lead-acid batteries are made up of a positive and a negative grid that are separated from each other by a porous insulator which may be comprised of such materials as fiberglass, plastic, rubber or wood. The grids are made up of lead and lead-alloy plates and are generally cast grids covered by lead-paste or other compounds. The plates are submerged in an electrolyte solution of water and usually sulfuric acid. An electrochemical reaction creates a positive charge on the lead alloy plates and a negative charge on the lead plates. The negative plates are connected to the negative terminal and the positive plates are connected to the positive terminal. The plates are suspended in a plastic or glass composition container where the diluted sulfuric acid is introduced as an electrolyte.

Electricity is created during discharge by way of an electrochemical reaction. Due to the characteristics of the metals, separated by the conducting liquid, electrons migrate. The electron migration creates a voltage potential, which upon discharge generates an electric current. During the electrochemical reaction, the sulfuric acid electrolyte is converted to water as lead sulfate forms on the plates. Hydrogen gas is the byproduct of this reaction. The amount of charge remaining in the cell can be determined by measuring the specific gravity of the electrolyte compared to water. When the plates are fully coated with lead sulfate and the sulfuric acid has been converted to water, the battery is considered fully discharged.

Fully discharging such a battery, as described above, occurs relatively quickly. As a result, the battery can be used only for short bursts of energy, such as starting a car, or for relatively low electrical demand requirements, such as powering lights, before recharge is required. These drawbacks are why such batteries have not proven particularly successful in such electrically powered devices as fully battery-driven automobiles.

Recharging involves passing a current through the battery so as to reverse the chemical reactions at the electrodes and in the sulfuric acid mixture. Recharging tends to restore the electrode plates to their original state and reconstitute the sulfuric acid mixture. If the cell is overcharged, however, electrolysis of water occurs, creating oxygen and hydrogen. Should electrolysis happen, water must be added to the battery in order to recreate a properly constituted electrolyte solution of water and sulfuric acid. Furthermore, electrolysis creates a potentially dangerous condition with possible disastrous consequences since both hydrogen and oxygen are highly explosive gases.

Storage batteries usually have exposed positive and negative terminals that are directly attached to the battery. Such terminals tend to corrode which reduces current and voltage generation.

When used to start and operate devices such as lights or engine-driven devices, storage batteries are continually recharged by a generator or alternator which delivers an electrical charge to the battery while the engine (gas or diesel) is running. The generator or alternator must be regulated to ensure that a sufficient charge arrives at the battery and yet avoids an overcharge which would cause electrolysis and a possible explosion.

Storage batteries have been known for years and they can be made from numerous combinations of metals for electrodes and chemicals for electrolytes. Improvements have consisted of changing the composition of the electrodes, rearranging the inner construction of the cell, or changing the electrolyte. Electrode composition has included zinc, copper, silver, gold, nickel, cadmium, iron and various other mixtures of metals. Electrolyte composition has included sulfuric acid, potassium hydroxide, zinc hydroxide, sulfuric and other electrolytes.

Recent improvements have included modified vent caps for each cell that trap most of the evaporated water, allowing the water to condense and drain back into the case. Batteries are also often fully sealed to prevent water from escaping. Such batteries include empty spaces within the case to accommodate the buildup of hydrogen gas. Previous batteries had vent caps that allowed water vapor to escape which allowed the sulfuric acid solution to become too acidic, thereby corroding the plates. Other improvements directed to the plates include lead-calcium alloy plates and special plate coatings such as Teflon to help the plates resist corrosion. Also, improvements such as strengthening and encapsulating plates to prevent electrical shorts due to vibration have been implemented. The Battery Council International states that the average car battery life is 3½[ye]ars. Even with the improvements mentioned above, car batteries manufactured under current technology last approximately 7 years.

The fact remains, however, that little has changed in the fundamental design of storage batteries since Gaston Plante invented the battery cell in 1860. Present day batteries, while having longer life than earlier models, must still be almost constantly recharged. These batteries are also heavy, cumbersome, limited in the number of volts produced, limited in the current produced, and potentially dangerous. The batteries cannot deliver a sustained, predictable, reliable source of power over time and are essentially and fundamentally inefficient. These batteries consume far more energy during recharging than they can ever generate. The cost of energy production from such a source is high. Thus, the applications for such batteries are severely restricted.

SUMMARY OF THE INVENTION

The long-life battery described herein differs from existing storage batteries and resolves many of the drawbacks associated with present day batteries.

A first, separate aspect of the present invention is a battery that generates power efficiently and requires fewer recharges.

A second, separate aspect of the present invention is a battery that operates for a sustained period of time before recharging is required, and therefore can serve as a primary power source for electrically powered devices.

A third, separate aspect of the present invention is a battery that produces a sustained predictable, reliable source of power over time.

A fourth, separate aspect of the present invention is a battery that is efficient, has long-life and is lightweight relative to the voltage and amperage produced.

A fifth, separate aspect of the present invention is a battery that can be configured to generate any voltage and/or any amperage.

A sixth, separate aspect of the present invention is a battery suitable for numerous uses including electrically-powered devices, electric cars, electric vehicles, lights, radios, computers, spacecraft, power tools, military devices and devices requiring either a main or back-up source of electricity.

A seventh, separate aspect of the present invention is a battery that provides power for any application where a conventional secondary or storage battery is now used.

An eighth, separate aspect of the present invention is a terminal-less battery that has insulated battery leads.

Further objects and advantages will become apparent from a consideration of the ensuing description, drawings and full consideration of the scope of the long-life battery.

BRIEF DESCRIPTION OF THE DRAWINGS

The various objects, features and advantages of the present invention will be better understood by considering the Detailed Description of a Preferred Embodiment which follows together with the drawing figures, wherein.

DETAILED DESCRIPTION OF A PREFERRED EMBODIMENT

Figure 1:
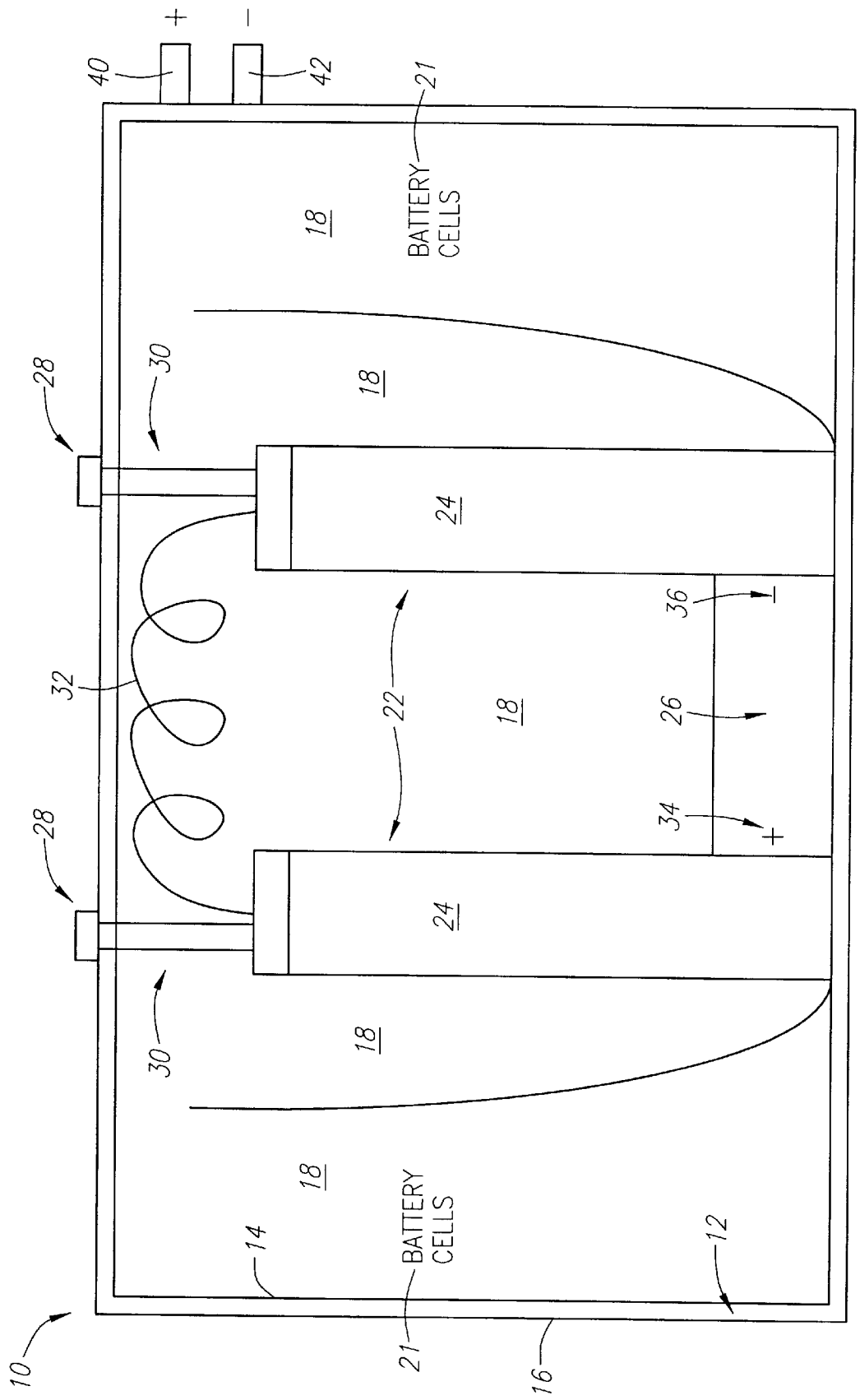
FIG. 1 is a cutaway side view of preferred embodiment of a long-life battery.

In the preferred embodiment, the long-life battery differs significantly with respect to the overall structure and internal design of other batteries and reflects a major change from prior art battery designs. These improvements in the long-life battery enhance its performance, longevity, durability and independent power production. These and other enhancements are made possible by the controlled introduction of heat and a magnetic field into the long-life battery. Controlled use of heat and a magnetic field creates an internal environment which affects operation of the long-life battery in a markedly advantageous way.

A well-known concept is that heat enhances chemical processes. For instance, a battery subjected to cold temperatures may lose more than half of its warm-weather power or amperage. Paradoxically, however, battery life is not improved in warm climates. The Car Care Council reports that batteries last significantly longer in cold climates such as Chicago than they do in hot areas such as Phoenix. Two reasons exist. The first reason is that heat causes water to be lost by evaporation from the battery which disturbs the concentration of the sulfuric acid mixture. This evaporation problem has been virtually eliminated through the special vent caps described above and through a completely-sealed battery. The second reason is that heat causes the plates in the battery to transform faster, thus requiring more frequent recharging and thereby reducing the life of the battery. Manufacturers of vehicles and other devices, therefore, have attempted to avoid placing their batteries in a hot environment. They have gone so far as to place batteries away from sources of heat. Car batteries, for instance, have been removed from under the car hoods where they were subject to engine heat and relocated under seats, in trunks and in other cooler places.

The long-life battery does not seek to avoid heat. By contrast, a central component of the long-life battery is the actual introduction of a heat source into the battery itself. The heat enhances the electrochemical process which occurs within the battery, thereby facilitating the production of voltage (force) and amperage (current).

Heat may be introduced into the long-life battery in a variety of ways, some examples of which are as follows. A heat source external to the battery could direct heat onto the battery. The battery could be wrapped by a heat producing mechanism, much like an electrical blanket. Hot air could be blown onto the battery. The walls of the battery could include a heat source. Further, any number of heat sources may be located within the battery itself. A metal coil that generates heat when an electrical current passes through the coil could serve as the heat source. The source of heat could be electrical, chemical, combustion, solar, or through the operation of gravity, friction, or any other source. While alternative heat sources may suffice, the preferred heat source for the long-life battery is a mixture comprising a combination of 50% hydrochloric (HCL) acid and 50% muriatic acid. The HCL acid is originally formed by passing HCL gas through water which results in a maximum concentration of HCL of about 35% HCl. Muriatic acid contains less HCL and has a maximum HCL concentration of about 31.5%. The muriatic acid and HCL acid used in testing of the above mixture were manufactured by Chem Lab Products located in Ontario, Calif. Each of these acids has the same base (HCL), but they function differently and when combined in the embodiment of the present invention as described herein, they produce heat over time. In a test of an embodiment of the present invention, the 50% muriatic acid—50% hydrochloric acid mixture was found to generate heat in the temperature range of 75 degrees Fahrenheit to 225 degrees Fahrenheit. The battery temperature was approximately 220 degrees at full operation and significantly lower when not in use. Certainly, other chemical mixtures could be employed to act as the heat source and other temperature ranges produced.

FIG. 1 is a cutaway side view of a long-life battery that embodies the present invention. The long-life battery 10 has a housing 12 formed of steel 14 and externally covered by plastic or fiberglass 16. A sulfuric acid mixture 18 from a conventional battery, which comprises water and sulfuric acid, flows within the long-life battery housing 12. The long-life battery 10 contains an open steel casing insert 20. The steel casing insert 20 is inserted into and mounted to the bottom of the long-life battery 10. A long-life battery 10 will use at least one steel insert 20. The sulfuric acid mixture 18 flows in and out of the steel insert 20. Battery cells 21 are placed within housing 12 and adjacent to said insert 20. Battery cells 21 can be any conventional or well-known battery cells used in the art.

Each steel insert 20 contains at least two steel acid containers or tubes 22. The acid containers 22 are mounted to the bottom of the open steel casing insert 20. Each container 22 is formed of steel and is preferably thick so as to be acid-resistant. Each container 22 is filled with the muriatic-hydrochloric acid mixture 24 described above. When the muriatic-hydrochloric acid mixture 24 heats up, the steel containers 22 heat up, thereby raising the temperature of the sulfuric acid mixture 18. The plastic or fiberglass covering 16 also acts as an insulator to maintain the temperature of the battery. At higher temperatures, the insulating layer may be made thicker or of alternative materials.

The containers 22 within a steel insert 20 are separated by a magnet 26. The purpose of the magnet is discussed later. The muriatic-hydrochloric acid mixture 24 is consumed slowly during operation of the battery 10. Thus, the containers 22 have filling tubes 30 that extend from the top of the containers to the top surface of the battery 10. The filling tubes 30 have removable caps 28 (by screwing or otherwise opening) which allow a user to add additional muriatic-hydrochloric acid mixture (or muriatic acid or hydrochloric acid alone) into the containers 22 from time to time as needed to maintain the proper constitution and amount of the acid mixture 24 in the containers 22. The caps 28 effectively seal the containers 22 to prevent mixing of the muriatic-hydrochloric acid mixture 24 with the sulfuric acid mixture 18 and to prevent leakage of the toxic fumes from the muriatic-hydrochloric acid mixture 24. The battery could also eliminate the filling tubes or have some other mechanism for refilling acid into the containers 22.

The containers 22 are preferably grounded at multiple points so that the containers 22 remain well grounded even if one or more of the grounding points are destroyed by the corrosive effects of the various acids or external shocks to the battery system. The containers 22 are mounted to the metal housing 14 of the battery 10 which serve to ground the containers 22. Grounding wires 32 may be used to connect the caps 28 together and further ground the containers 22. Grounding wires 32 may alternatively comprise metal ribbons or bars. The containers 22 may be further grounded via wires, ribbons or bars to the metal housing 14 on the side of the battery 10.

The internal heat source created by the containers 22 of the muriatic-hydrochloric acid mixture 24 produces an environment which improves the operation of the battery 10 by enhancing chemical reactions. The internal heat source is long-lived and produces heat continuously and over time. The heat source requires no electrical input and does not drain electricity from the battery itself.

The second unique element of the long-life battery 10 is the use of a magnetic field which also can be introduced in various ways. One possibility is the introduction of an electromagnet to generate an electromagnetic field. Containers 22 could be used as part of the source which generates the electromagnetic field if the containers were made of a suitable metal. The major disadvantage of the use of an electromagnet is that the magnetic force must be created by the passage of an electrical current around a metal core, which requires either an additional electrical source to generate the current or the siphoning of some current from the battery itself. Either solution makes the electromagnet approach less efficient than the second method.

The second possibility is the introduction of a magnetized piece of metal or magnet. A magnet does not need electricity to create its field of force. This field of force operates continuously and needs no outside source of power. Thus, the preferred embodiment utilizes a permanent magnet 26. Permanent magnets are graded between 1 to 45 where the higher the grade, the stronger the magnetic field generated by the magnet. Rare earth magnets of the type used in music speakers have grades of 24 to 45, while magnets used in motors and generators have grades of about 5 to 8. Grade selection may depend on the battery, the heat source, the electrolyte, and/or the proposed use of the battery. Test batteries embodying the invention used a rectangular industrial permanent magnet having a grade of between 5 and 8 that was manufactured by Magnet Sales and Manufacturing, Inc. of Culver City, Calif. Any shape, size and variation of magnet may be used, depending on these factors. In general, as the temperature generated by the heat source increases, the magnet's grade should increase.

As noted above, the introduction of heat alone in a storage battery causes its life to be shortened rather than lengthened. Although heat stimulates chemical activity to increase the current, force and power of the battery, the plates (not shown) within the battery corrode much more quickly, thus actually diminishing the time that the battery can produce power before recharging is required. The conjunctive introduction of a magnetic field and a heat source into the long-life battery changes this dynamic. Heat stimulates the chemical activity to increase the current, force and power generated by the battery, while it is believed the magnetic field impacts the flow of electrons, among other effects, which slows down the corrosive effect of heat and the generation of lead sulfate on the plates. That is, the magnet's effect on the motion of electrolytic molecules and the alignment of the magnet create an internal environment in the battery which continuously counteracts the process that ultimately requires recharging of the battery. Under the magnetic field environment, the plates of the battery are not transformed as quickly as in the absence of a magnetic field. Since the plates maintain their composition longer under a magnetic field, the heat source produces current, force and power over a greater life time before recharging is required. Recharging is eventually necessary, but not as quickly as recharging is required in existing storage batteries. Thus, the resulting long-life battery can be used as a primary power source for virtually any application.

In the preferred embodiment, the magnet 26 lies with its positive end 34 touching one of the containers 22 and its negative end 36 touching the other container 22. The magnetic field generated may reach the battery cells and even external of the battery 10. The strength and composition of the magnet used may depend on the factors discussed above. All of these magnet characteristics can be changed to suit the particular needs of the battery or electrically-powered device.

The long-life battery is not limited in the amount of voltage or amperage produced. To generate a given voltage, simply increase the number of cells connected in series until the desired voltage output is achieved. Likewise, increase the number of cells connected in parallel until the desired amperage output is achieved. Any combination of cells in series and cells in parallel is possible, thereby allowing any resulting combination of voltage and current. Although cells of ordinary batteries may be combined in various combinations to achieve greater voltages and currents, the long-life battery using the present invention requires fewer cells to achieve the same voltage/current and life. Consequently, the resulting long-life battery is lighter in weight than a comparable conventional battery. The lightweight, longer-life and more efficient battery described herein thus has many advantageous uses, including many if not all of the present battery applications as well as applications not currently suitable for batteries. Where the magnetic field might interfere with the electrically-powered device or nearby devices, the long-life battery may be shielded by any well known method, or the battery may be relocated to a more tolerant location.

Figure 2:
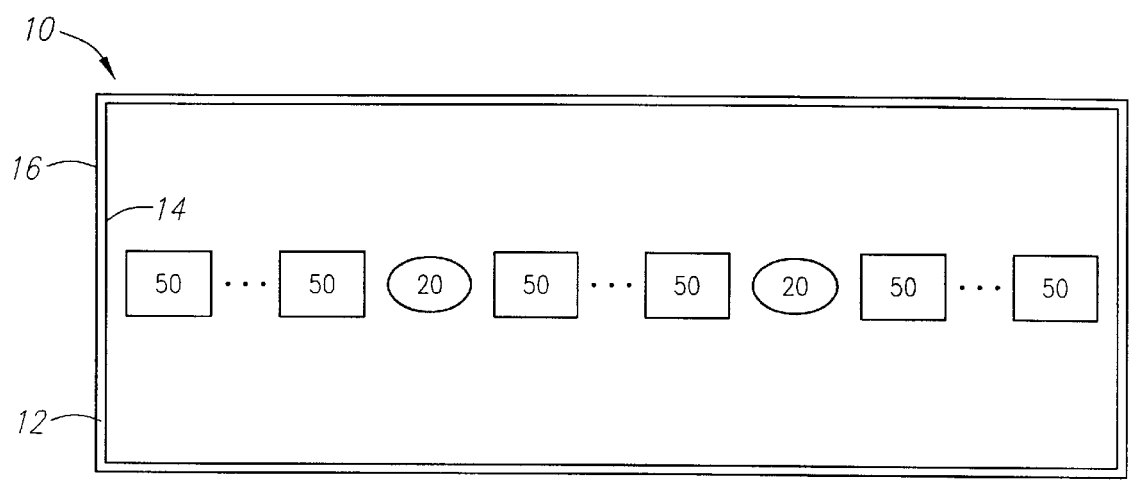
FIG. 2 is a cutaway view of the top of a battery that has multiple inserts.

FIG. 2 illustrates a battery having multiple inserts. Battery cells 50 are located inside battery 10. Each cell 50 may comprise a cell known to those of ordinary skill in the art. For instance, a cell 50 may comprise plates or grids made of lead alloy. Cells may be made of other materials such as nickel-cadmium, nickel-iron and silver-zinc. Inserts 20 are placed between battery cells 50. As shown, each insert 20 lies between two cells of a line of cells. Alternatively, the cells 50 can be configured to lie in a triangular or circular pattern around an insert 20 so that each insert 20 is close in proximity to more than two cells. The electricity from the cells is transmitted out of the battery 10 over terminals 40, 42 (or insulated leads if terminals are absent).

A test battery has been found to increase the life of a six-cell 12 volt battery. The test battery included one steel insert 20 having two containers 22 and one magnet 26. The insert 20 was placed between two groups of three cells in the 12 volt battery. An insert 20 could be altered to have any number of containers 22 and any number of magnets 26. The test battery was then connected to a V-8, 350 cubic inch gasoline engine. The test battery ran the engine without the benefit of an alternator or other electrical source for at least 60 hours and yet did not completely drain the battery. The engine was not run for 60 hours straight, but usually at several hours per day, over a period of approximately a month.

Figure 3:
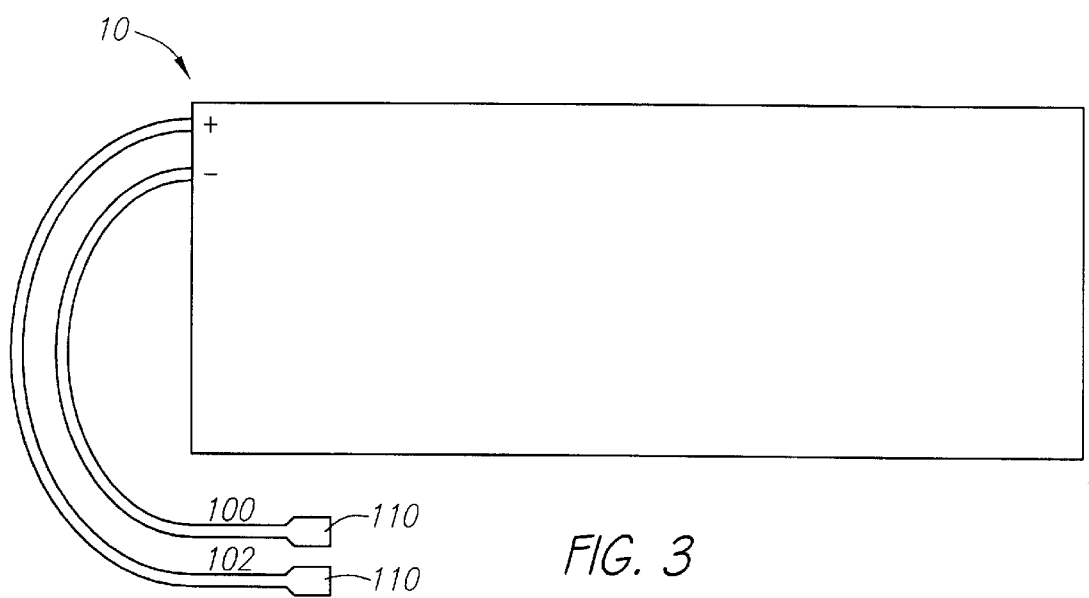
FIG. 3 is a diagram of a terminal-less battery having insulated battery leads.
Figure 4:
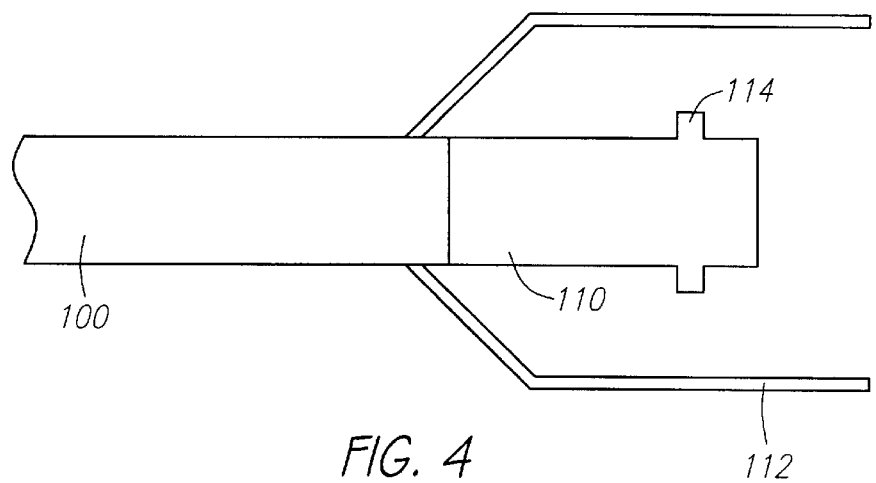
FIG. 4 is a side cutaway view of an insulated battery lead with a connector and insulation cover.
Figure 5:
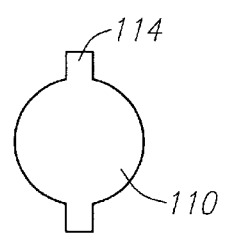
FIG. 5 is a top end plan view of an insulated battery lead with a connector.
Figure 6:
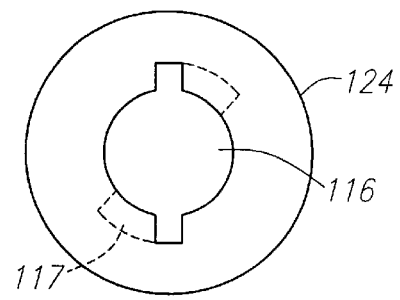
FIG. 6 is a plan view of a mating connector which mates with the connector of the insulated battery lead.

The long-life battery 10 may be built without terminals 40, 42 which are easy targets for corrosion caused by acid leaks. Instead, as shown in FIG. 3, the terminal-less long-life battery 10 may use insulated leads 100, 102 that connect away from the battery itself, thus eliminating corroded terminals. The insulated leads 100, 102 may be a foot long with a snap or twist connector 110 for connecting to the device to be electrically powered. FIG. 4 shows a side cutaway view of an insulated battery lead with a metal connector 110. Preferably the connector 110 has an insulating cover 112 that protects the connector 110 from corrosion. The insulating cover 112 also protects the lead from shorting which might arise if an uninsulated lead touches a conducting material. The insulating cover 112 may either peel back to reveal the physical connector 110 or extend beyond the connector 110 so as to completely cover the connector 110 when the connector 110 is connected to a mating connector. FIG. 5 is a plan view of the top end of the connector 110 which has flanges 114. FIG. 6 is a plan view of a mating connector 116 which has mating grooves 118 that engage the flanges 114.

Figure 7:
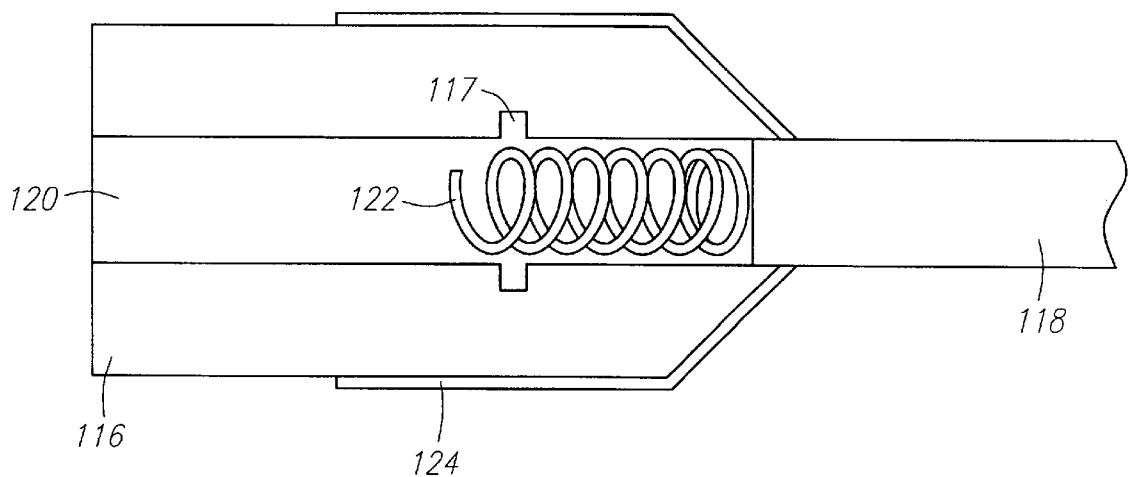
FIG. 7 is a side cutaway view of the mating connector.

FIG. 7 illustrates the mating connector 116 in greater detail. The mating connector 116 is connected to an insulated lead 118 from a device that is to receive electricity from the battery. The mating connector 116 is made of metal or other conducting material and has a hollow core 120. A spring 122 resides inside the hollow core 120. The mating connector 116 has an insulating cover 124 that covers part of the metal portion of mating connector 116. The uncovered portion of the mating connector 116 is covered by the insulating cover 112 of the connector 110.

When the connector 110 is twisted or snapped into the mating connector 116, the flanges 114 and mating grooves 117 couple and lock the connectors together. In the particular embodiment, the connector 110 is a male connector that mates with a female mating connector 116. When the male connector 110 is inserted into the hollow core 120 of the mating connector 116, the end of the connector 110 is pressed against the spring 122 contained within mating connector 116. When the connector 110 is twisted, the flanges 114 of the connector 110 enters the mating grooves 117 which are cut into the hollow core surface of the mating connector 116. The spring 122 keeps the flanges 114 pressed against mating grooves 117 in a locked fashion. To disengage the connector 110 and the mating connector 116, one pushes the connector 110 further into the mating connector 116 (against the action of the spring 122) and then twists the connector 110 in the opposite direction to release the flanges 114 from the mating grooves 117. Both connector 110 and mating connector 116 may be made of a high quality steel or another suitable material. Mating connectors 116 may be crimped onto a mating lead or the device to be electrically powered if the lead lacks mating connectors.

To recharge the long-life battery 10, the process used to recharge other rechargeable batteries may be utilized. In other words, a current is passed through the battery terminals 40, 42 (or battery leads 100, 102) in the reverse direction as the current flow during battery operation. Alligator clamps from a battery charger can be clamped onto the connectors 110.

The present long-life battery which uses both a heat source and a magnetic field source represents one of the first fundamental design changes to be made in battery technology since the time of Gaston Plante. As described, the long-life battery utilizes a new electrochemical process which is internal to the battery itself and inserted in such a way as to interact with the cells, plates and electrolyte. This new process creates a specific operation environment that allows the long-life battery to generate significant quantities of electrical energy over time, without requiring as many recharges. The long-life battery operates for a sustained period of time before recharging is required. Therefore, the long-life battery can serve as a primary power source capable of operating innumerable conveyances, appliances, machines, tools, vehicles, equipment, lights and devices. For instance, the long-life battery may power electrical vehicles, aircraft, cars, spacecraft, machines, tools, lights, radios, stereos, compact disc players, telephones and computers. The long-life battery may be used as a backup power source for any device including vehicles whose gasoline/diesel/methanol engines are inoperational. The longlife battery could even power remote residences or businesses where transmitted power is unavailable or cost-prohibitive. Hence, the long-life battery is suitable for any application where a conventional secondary or storage battery is presently used as well as those applications ill-suited for conventional batteries.

While the invention is susceptible to various modifications and alternative forms, specific examples thereof have been shown by way of example in the drawings and are herein described in detail. It should be understood, however, that it is not intended to limit the invention to the particular forms disclosed, but on the contrary, the invention is to cover all modifications, equivalents, and alternatives falling within the spirit and scope of the invention as defined by the following claims.

We claim:

1. A battery comprising:

a housing containing at least one battery cell;

an electrolytic material contained within said housing;

a heat source within said housing; and a magnetic field source within said housing.

2. The battery of claim 1 wherein said electrolytic material is an electrolytic liquid within said housing.

3. The battery of claim 1 wherein said magnetic field source comprises:

a magnet coupled to said heat source.

4. The battery of claim 1 wherein said magnetic field source comprises:

an electromagnet coupled to said heat source.

5. The battery of claim 1 further comprising:

a pair of insulated leads extending out of said battery to provide electrical connection between said battery and an external device.

6. The battery of claim 2 wherein said electrolytic liquid is a composition of sulfuric acid and water.

7. The battery of claim 1 wherein said housing has hollow walls and said heat source is contained within the hollow walls of said housing of the battery.

8. The battery of claim 1 wherein said heat source uses gravity to generate heat.

9. A battery system comprising:

a heat source;

a battery heated by said heat source including:

a housing;

an electrolytic solution disposed within said housing;

a plurality of battery cells contained within said housing;

a plurality of inserts mounted to said housing; and a magnetic field source disposed within each of said inserts.

10. The battery system of claim 9 wherein said heat source is a metal that generates heat when an electrical current passes through the metal.

11. The battery system of claim 9 wherein said heat source is external to said battery and directs heat onto said battery.

12. The battery system of claim 9 wherein said heat source is wrapped around said battery.

13. The battery system of claim 9 wherein said heat source uses solar energy to generate heat.

* * * * *